United States Patent
Kong

(10) Patent No.: US 8,676,280 B2
(45) Date of Patent: Mar. 18, 2014

(54) ANTENNA CASE FOR ENHANCING TRANSMISSION AND RECEPTION OF RADIO WAVES

(75) Inventor: Byung-Won Kong, Seoul (KR)

(73) Assignee: Zalman Tech Co., Ltd., Seoul (KR)

( * ) Notice: Subject to any disclaimer, the term of this patent is extended or adjusted under 35 U.S.C. 154(b) by 113 days.

(21) Appl. No.: 13/424,894

(22) Filed: Mar. 20, 2012

(65) Prior Publication Data

US 2013/0102367 A1    Apr. 25, 2013

(30) Foreign Application Priority Data

Oct. 20, 2011  (KR) .................. 10-2011-0107713
Feb. 9, 2012   (KR) .................. 10-2012-0013331

(51) Int. Cl.
*H04B 1/00*       (2006.01)

(52) U.S. Cl.
USPC .................................... 455/575.8; 455/575.1

(58) Field of Classification Search
USPC ........ 455/575.1, 575.8, 90.3, 550.1, 107, 121
See application file for complete search history.

(56) References Cited

U.S. PATENT DOCUMENTS

2010/0078343 A1*  4/2010  Hoellwarth et al. .......... 206/320
2013/0207852 A1*  8/2013  Nakano ......................... 343/702

FOREIGN PATENT DOCUMENTS

| JP | A-2002-109492 | 4/2002 |
| JP | A-2006-180211 | 7/2006 |

* cited by examiner

*Primary Examiner* — Sonny Trinh
(74) *Attorney, Agent, or Firm* — Nixon & Vanderhye, PC

(57) ABSTRACT

A portable accessory for preventing death grip of a hand-held apparatus and improving radio wave transmission and reception of the hand-held apparatus. The portable accessory includes an inductive signal amplifying circuit including: a radio transmission/radio unit that transmits or receives radio waves; a capacitive coupled unit that is capacitively coupled with an antenna mounted in the hand-held apparatus; and an impedance matching unit that connects the radio wave transmission/reception unit and the capacitive coupled unit and transmits radio waves.

11 Claims, 6 Drawing Sheets

ANTENNA CASE FOR ENHANCING TRANSMISSION AND RECEPTION OF RADIO WAVES

CROSS-REFERENCE TO RELATED PATENT APPLICATION

This application claims the benefit of Korean Patent Application Nos. 10-2012-0013331, filed on Feb. 9, 2012, and 10-2011-107713, filed on Oct. 20, 2011, in the Korean Intellectual Property Office, the disclosure of each of which are incorporated herein in their entirety by reference.

BACKGROUND OF THE INVENTION

1. Field of the Invention

The present invention relates to an accessory for improving radio wave transmission and reception in a hand-held apparatus such as a smartphone, a tablet, a personal digital assistant (PDA), and a laptop computer, and more particularly, to a protection case and a protection film that improve radio wave transmission and reception.

2. Description of the Related Art

Along with the rapid increase in use of hand-held apparatuses such as smartphones and tablets, radio wave transmission and reception conditions in the hand-held apparatuses are an important issue. In particular, if a portion of a smartphone where an antenna is mounted is held by the hand during a telephone conversation or data communication, death grip, which refers to a decrease in call quality or call drops, and an increase in battery consumption may occur.

SUMMARY OF THE INVENTION

The present invention provides a portable accessory that prevents death grip of a hand-held apparatus such as a smartphone without having to deform the hand-held apparatus, and increases sensitivity of radio wave transmission and reception by the hand-held apparatus.

According to an aspect of the present invention, there is provided a portable accessory for preventing death grip occurring recently in hand-held apparatuses or the like, and improving radio wave transmission and reception.

The portable accessory may be, for example, a protection case or a protection film. For example, for smartphones, the portable accessory may be implemented as a smartphone protection case or a protection film.

In addition, other accessories of various shapes and forms for hand-held apparatuses besides smartphones may also be used. For example, a portable accessory having various shapes such as a striped shape, a rectangular shape, various figures, a three-dimensional shape, a twisted shape, an animal or plant-like shape, or the like may be used.

Also, the portable accessory may be implemented as, for example, a sticker, a protection film, or a protection case that may be attached on a hand-held apparatus, or in the form of a doll, a string, a grip, or a case.

Accordingly, according to the embodiments of the present invention, by using a portable accessory for a hand-held apparatus, radio waves transmission and reception may be improved without changing internal and external structures of the hand-held apparatus, and death grip may be prevented.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
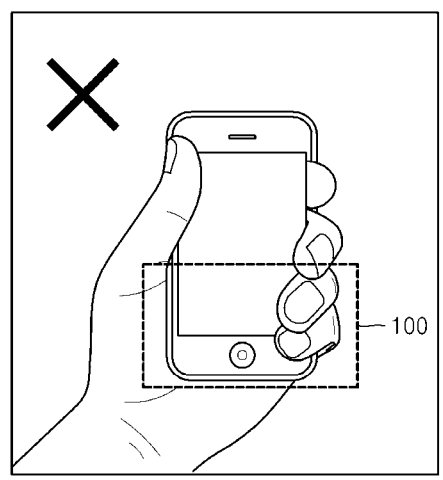
FIG. 1 is a schematic diagram of death grip (or call drop) which recently frequently occurs.

FIG. 1 is a schematic diagram of death grip (or call drop) which recently frequently occurs.

If a smartphone user grasps a lower portion 100 in which an antenna is mounted during a call via a smartphone or during data communication via the smartphone, the call may be dropped or quality of the call may decrease, which may increase battery consumption.

In other words, hand-effects according to how the user grips the smartphone are increasing, and if the user wraps his/her hand around the smartphone, an operating range of an antenna may shift or dielectric loss may occur, thereby reducing gains of the antenna. In order to solve this problem, a bumper is applied. However, even when a bumper is used, antenna gains are still short.

Figure 2:
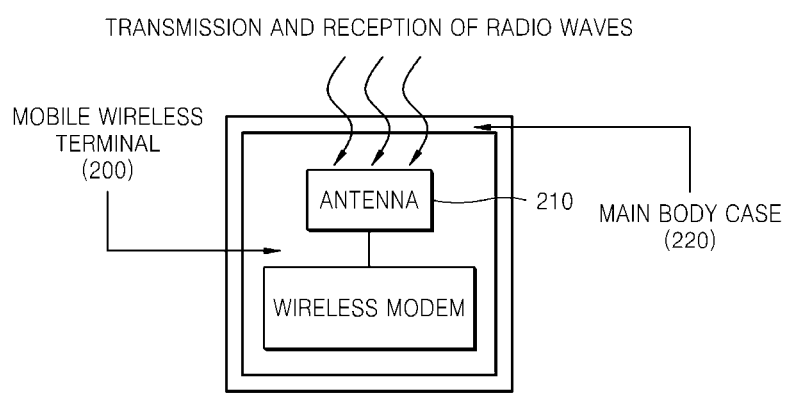
FIG. 2 is a diagram illustrating a structure in which radio waves are transmitted or received via an antenna of a portable wireless terminal.

FIG. 2 is a diagram illustrating a structure in which radio waves are transmitted or received via an antenna 210 of a portable wireless terminal.

As mobile wireless terminals have been reduced in size and become thinner, a size of the antenna 210 mounted in the mobile wireless terminals has also been reduced. For example, the antenna 210 may have a size that fits into the lower portion 100 of the smartphone illustrated in FIG. 1.

The antenna 210 is mounted in a main body case 220 of a hand-held apparatus such as a smartphone, a personal digital assistant (PDA), a personal multimedia player (PMP), a tablet, etc. to transmit or receive radio waves to or from the outside. However, as the antenna 210 becomes compact, if the lower portion 100 where the antenna 210 is mounted is held by the user's hand, as illustrated in FIG. 1, call quality may decrease remarkably and a battery may be consumed rapidly.

Figure 3:
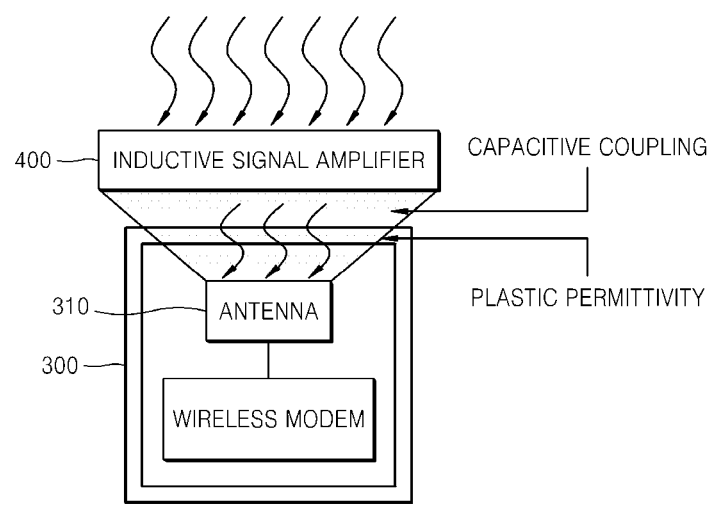
FIG. 3 is a schematic diagram illustrating a method of improving radio wave transmission and reception by a mobile phone by mounting a mobile phone protection case, according to an embodiment of the present invention.

FIG. 3 is a schematic diagram illustrating a method of improving radio wave transmission and reception by a mobile phone by mounting a mobile phone protection case, by which depth grip is prevented, according to an embodiment of the present invention.

It is to note that according to an embodiment of the present application, a portable accessory may be implemented as a protection case or a protection film, and other accessories of other shapes and forms for hand-held apparatuses besides smartphones may also be used. For example, an accessory having various shapes such as a striped shape, a rectangular shape, various figures, a three-dimensional shape, a twisted shape, an animal or plant-like shape, a doll, a string, a grip, a case, etc. may be used.

In addition, the accessory may be implemented as an adhesive type or a detachable type accessory such as a sticker, a protection film, or a protection case. Also, the accessory may be implemented, for example, as a radio frequency identification (RFID) tag.

According to an embodiment of the present invention, by using an accessory for a hand-held apparatus, radio wave transmission and reception may be improved without modifying internal and external structures of the hand-held apparatus and death grip may be prevented.

FIG. 3 is a diagram illustrating a mobile phone protection case for preventing death grip that recently occurs in smartphones, according to an embodiment of the present invention.

According to an embodiment of the present invention, an antenna mounted in a mobile phone protection case and an antenna mounted in a smartphone are capacitively coupled, thereby facilitating transmission or reception of radio waves, reducing signal distortion, and preventing death grip.

The mobile phone protection case according to the current embodiment of the present invention may be used for any portable wireless terminals that include an antenna that may be capacitively coupled with an antenna mounted in a mobile phone protection film.

Referring to FIG. 3, an antenna 310 in a mobile wireless terminal is disposed to be in capacitive coupling with an antenna mounted in a mobile phone protection case or an inductive signal amplifying circuit 400.

Figure 4:
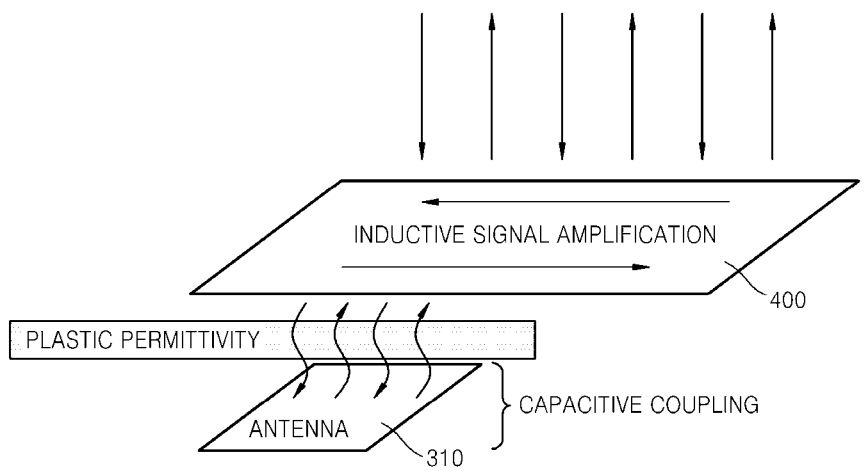
FIG. 4 is a schematic diagram illustrating a method of improving radio wave transmission and reception via capacitive coupling between an antenna mounted in a mobile phone protection case and an antenna mounted in a mobile phone, according to an embodiment of the present invention.
Figure 5:
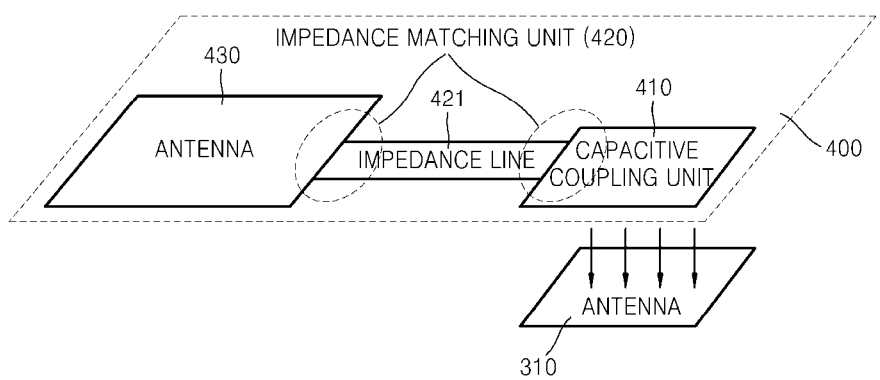
FIG. 5 is a detailed diagram of FIG. 4.

FIG. 4 is a schematic diagram illustrating a method of improving radio wave transmission and reception via capacitive coupling between an antenna mounted in a mobile phone protection case and an antenna mounted in a mobile phone, according to an embodiment of the present invention. FIG. 5 is a detailed diagram of FIG. 4. The method is described with reference to FIGS. 4 and 5.

The inductive signal amplifying circuit 400 mounted in the mobile phone protection case is disposed to form capacitive coupling with the antenna 310 mounted in the mobile phone. In this case, the capacitive coupling between the inductive signal amplifying circuit 400 mounted in the mobile phone protection case and the antenna 310 mounted in the mobile phone may vary according to permittivity of a material of an outer portion of the mobile phone. This will be described with reference to FIG. 7.

The inductive signal amplifying circuit 400 mounted in the mobile phone protection case may be disposed as broad as possible on a surface area of an inner portion of the mobile phone protection case. For example, a circuit may be designed over a surface area as broad as possible so as to surround an external angle of the inner portion of the mobile phone protection case, thereby increasing an area for transmitting or receiving radio waves. In addition, a circuit may be arranged to extend outside the mobile phone protection case or in a three-dimensional manner.

As illustrated in FIG. 4, capacitive coupling between the inductive signal amplifying circuit 400 and the antenna (FIG. 3, 310) in the mobile phone is obtained, and as radio waves are transmitted or received over a large area of the inductive signal amplifying circuit 400, the area for radio wave transmission and reception may be increased.

Referring to FIG. 5, the inductive signal amplifying circuit 400 mounted in the mobile phone protection case may include a radio wave transmission/reception unit 430, a capacitive coupled unit 410, and an impedance matching unit 420. An example of the radio wave transmission/reception unit 430 is an antenna. Also, the radio wave transmission/reception unit 430 may transmit or receive radio waves via Wifi or radio frequency (RF).

The capacitive coupled unit 410 in the mobile phone protection case may be disposed in a position corresponding to the built-in antenna 310 in the mobile phone 310. For example, when the antenna 310 in the mobile phone is disposed in the lower part of the mobile phone, the capacitive coupled unit 410 may also be disposed in the lower part of the mobile phone protection case so as to adjust a coupling interval of the capacitive coupling.

The impedance matching unit 420 induces flow of radio waves over a metal surface, and may transmit radio waves received from the radio wave transmission/reception unit 430 to the capacitive coupled unit 410 or may transmit radio waves of the capacitive coupled unit 410 to the radio wave transmission/reception unit 430.

An impedance line 421 connects the radio wave transmission/reception unit 430 and the capacitive coupled unit 410. The impedance matching unit 420 includes a portion where the impedance line 421 and the radio wave transmission/reception unit 430 meet and a portion where the impedance line 421 and the capacitive coupled unit 410 meet, and radio wave signals transmit without any loss along an impedance line when impedance matching is provided.

In particular, although the impedance matching unit 420 may preferably be disposed so as to surround a surface in the mobile phone protection case as broad as possible, if the impedance line 421 is too long, the function of a device in the mobile phone may degrade or radio waves may be lost. Thus, the impedance line 421 may preferably be short, and there is no need for a trade-off between the broad surface area in the mobile phone protection case and loss of radio waves of the impedance line 420.

According to an embodiment of the present invention, a protection film may be mounted over the inductive signal amplifying circuit 400 mounted in the mobile phone protection case. For example, a thin radio wave-transmissive dielectric having a thickness of 0.5 mm or less may be used as the protection film.

The mobile phone protection case may preferably be formed of a dielectric such as plastic or rubber, and may be not too thick so that loss of radio waves during transmission or reception of radio waves via the inductive signal amplifying circuit 400 may be reduced.

While the inductive signal amplifying circuit 400 mounted in the mobile phone protection case has been described, the inductive signal amplifying circuit 400 may also be mounted in other various positions.

According to an embodiment of the present invention, the inductive signal amplifying circuit 400 may have a structure in which a flexible print circuit board (FPCB) on which an amplifying circuit is designed is attached to a protection case for smartphones, etc. This will be described with reference to FIGS. 8 and 9.

Alternatively, the inductive signal amplifying circuit 400 may be attached on a rear surface of a mobile phone in the form of an adhesive protection film.

Alternatively, the inductive signal amplifying circuit 400 may be printed directly on a mobile phone protection case by using a silk printing method using a highly reflective coating agent (dielectric pigment), thereby increasing transmission/reception efficiency.

Figure 6A:
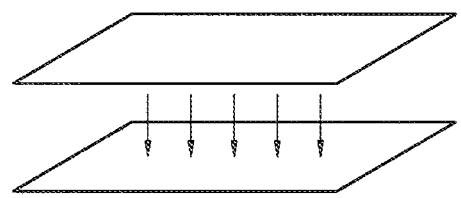
FIGS. 6A and 6B illustrate a position of a capacitive coupled unit according to an embodiment of the present invention.
Figure 6B:
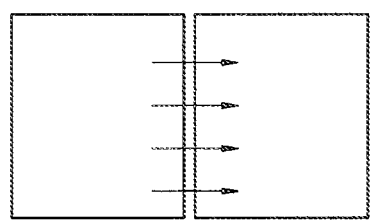

FIGS. 6A and 6B illustrate a position of a capacitive coupled unit according to an embodiment of the present invention.

The antenna 310 in the mobile phone (see FIG. 5) and the capacitive coupled unit 410 (see FIG. 5) in the mobile phone protection case may arranged in a non-contact manner with a dielectric that is vertically disposed therebetween.

Preferably, the capacitive coupled unit may be disposed in a mobile phone protection case to correspond to a position of the antenna mounted in the mobile phone. Also, so that radio waves may be induced between the antenna mounted in the mobile phone and the capacitive coupled unit in the mobile phone protection case, a coupling interval may be adjusted according to frequencies.

Figure 7:
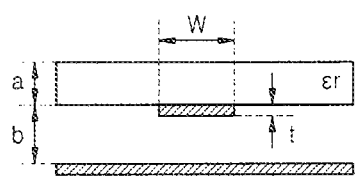
FIG. 7 is a schematic diagram illustrating a method of forming a capacitive coupled unit of an accessory according to permittivity of a material of an outer portion of a mobile phone, according to an embodiment of the present invention.

FIG. 7 is a schematic diagram illustrating a method of forming a capacitive coupled unit of an accessory according to permittivity of a material of an outer portion of a mobile phone, according to an embodiment of the present invention.

Permittivity of dielectrics varies according to types of mobile phones. In general, the higher the permittivity, the lower the radio wave transmission rate, and thus, plastic is frequently used to form an outer portion of a mobile phone (e.g., a mobile phone case).

According to an embodiment of the present invention, a matching circuit used inside a mobile phone case (or an inductive signal amplifying circuit) is implemented in various manners according to permittivity of a material of an outer portion of a mobile phone. A matching circuit includes a radio wave transmitting unit (not shown), a capacitive coupled unit (not shown), and an impedance matching unit (not shown).

That is, permittivity of a capacitive coupled unit used in an inner circuit of a mobile phone protection case is adjusted according to permittivity of the material of an outer portion of a mobile phone so as to obtain a maximum capacitive coupling. When manufacturing a case using a material having a high permittivity, since a frequency transmits the material and thus an effective wavelength is shortened, a compact antenna may be used, but on the other hand, an application frequency bandwidth is reduced and frequency loss is usually increased.

According to an embodiment of the present invention, a material having a permittivity $\epsilon_r$ of about 2.0 to 3.5 may be used to minimize frequency loss. Although, for example, Teflon may be used to reduce manufacturing costs, polycarbonates having a high intensity may also be used with a thin thickness so as to minimize loss of radio waves.

Also, according to an embodiment of the present invention, an antenna or a capacitive coupling device uses a ¼ wavelength, and in this case, an effective dielectric constant is as expressed in Equation 1.

$$\sqrt{\epsilon_e} = 1 + \frac{a}{b}\left(\overline{a}_1 - \overline{b}_1 \ln\frac{W}{b}\right)\left(\sqrt{\epsilon_e} - 1\right) \qquad \text{[Equation 1]}$$

where $$\overline{a}_1 = \left(0.5173 - 0.1515\ln\frac{a}{b}\right)^4, \overline{b}_1 = \left(0.3092 - 0.1047\ln\frac{a}{b}\right)^4,$$

$\epsilon_e$ denotes effective permittivity, $\epsilon_r$ denotes permittivity of a material, a denotes a substrate thickness, b denotes a distance, W denotes a width of an antenna pattern, and f denotes a frequency.

Equation 2 shows a length of an effective wavelength using an effective permittivity.

$$lengthofeffectivewavelength = \frac{lengthofwavelength}{\sqrt{\epsilon_r}} \qquad \text{[Equation 2]}$$

Equation 3 shows a relationship between an effective permittivity and permittivity of a material.

$$\sqrt{\epsilon_e} = 1 + \frac{a}{b}\left(a_1 - b_1\ln\frac{W}{b}\right)^4 \qquad \text{[Equation 3]}$$

$$a_1 = \left(0.5173 - 0.1515\ln\frac{a}{b}\right)^4$$

$$b_1 = \left(0.3092 - 0.1047\ln\frac{a}{b}\right)^4$$

Figure 8:
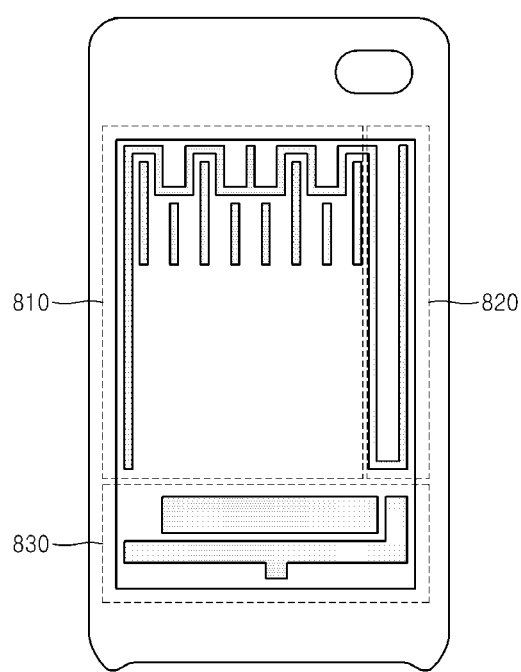
FIG. 8 is a schematic diagram illustrating an inductive signal amplifying circuit mounted in a mobile phone protection case, according to an embodiment of the present invention.

FIG. 8 is a schematic diagram illustrating an inductive signal amplifying circuit mounted in a mobile phone protection case, according to an embodiment of the present invention.

An impedance matching unit of the inductive signal amplifying circuit is formed to surround a surface of an inner portion of the mobile phone protection case as broad as possible but a here short impedance line is included.

According to an embodiment of the present invention, an impedance matching unit 820 of the inductive signal amplifying circuit may connect a radio wave transmission/reception unit 810 and a capacitive coupled unit 830, and function as an impedance line for extending impedance matching by extending the radio wave transmission/reception unit 810 at the same time.

Although the radio wave transmission/reception unit 810 and the impedance matching unit 820 are separated in the current embodiment of the present invention, the embodiment of the present invention is not limited thereto.

Figure 9:
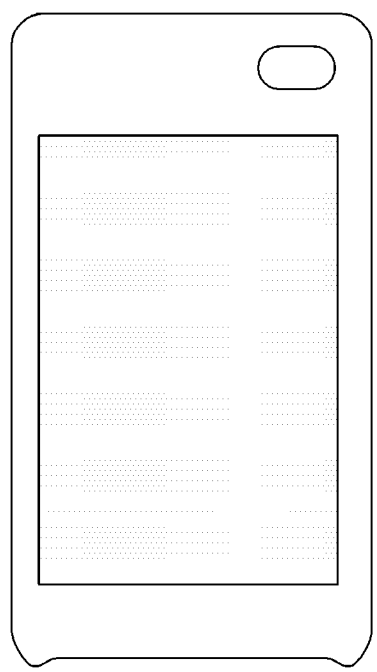
FIG. 9 is a schematic diagram illustrating an inductive signal amplifying circuit covered with a protection film, according to an embodiment of the present invention.

FIG. 9 is a schematic diagram illustrating an inductive signal amplifying circuit covered with a protection film, according to an embodiment of the present invention.

In a wireless terminal including batteries for transmitting or receiving frequencies via an antenna (e.g., smartphones or hand-held apparatuses), a lifespan of the batteries may vary according to radio environments because data throughput and signal output power vary according to a modulation method of a wireless modem mounted in the wireless terminal. That is, if a wireless signal having a high intensity is received, communication is performed at a high speed and a low output, and if a wireless signal having a low intensity is received, communication is performed at a high output and a low speed. That is, if effective isotropically radiated power (EIRP) of the wireless terminal is high, a communication success rate even in a low-frequency signal environment is increased.

EIRP refers to the amount of power in a condition in which peak power point of an antenna is assumed as radiating in all directions. EIRP is calculated by multiplying an input power by an antenna gain and is used as an index for collectively determining a power-gain performance of a transmission/reception system based on an omni-directional antenna. In detail, if power of 30 dBm is radiated from a predetermined antenna and a gain thereof is 10 dBi, the EIRP is 30+10=40 dBm.

According to the embodiments of the present invention, to increase an antenna gain of the EIRP, which is the total sum of the radiated power of the predetermined antenna and the antenna gain, the lifespan of the batteries may be increased by reducing an output power of an active device of the wireless communication system in which battery consumption is high and by increasing the antenna gain of the antenna, which is a passive device where a battery is not consumed.

In addition, according to the embodiments of the present invention, an efficiency of transmission output is improved by improving a voltage standing wave ratio (VSWR) of basically built-in antenna. In other words, a VSWR of an antenna case used in smartphones or wireless terminals according to the embodiments of the present invention is reduced to be lower than that of conventional antennas such that an output of waves transmitted from the wireless terminals does not return but is radiated in the air with a high efficiency, thereby reducing power loss in a low output power.

According to the embodiments of the present invention, intensity of radio waves that are received or transmitted by a mobile phone may be increased by using a portable accessory. In addition, according to an embodiment of the present invention, by increasing a surface area over which radio waves may be transmitted or received, by using the portable accessory, death grip of a smartphone may be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An antenna case for smartphones and wireless terminals comprising an inductive signal amplifying circuit, wherein the inductive signal amplifying circuit comprises:
   a radio transmission/radio unit that transmits or receives radio waves;
   a capacitive coupled unit that is capacitively coupled with an antenna mounted in a hand-held apparatus; and
   an impedance matching unit that connects the radio wave transmission/reception unit and the capacitive coupled unit and transmits radio waves.

2. The antenna case of claim 1, wherein the capacitive coupled unit is disposed at a position to correspond to the antenna mounted in the hand-held apparatus in the inductive signal amplifying circuit.

3. The antenna case of claim 1, wherein the capacitive coupled unit is capacitively coupled with the antenna mounted in the hand-held apparatus in a non-contact manner with a dielectric disposed therebetween.

4. The antenna case of claim 3, wherein the dielectric is formed of a material that forms an outer portion of the hand-held apparatus.

5. The antenna case of claim 1, wherein permittivity of the capacitive coupled unit is adjusted according to a material of an outer portion of the mobile phone such that a maximum capacitive coupling between the capacitive coupled unit and the antenna mounted in the hand-held apparatus.

6. The antenna case of claim 1, wherein the antenna case is a mobile phone protection case.

7. The antenna case of claim 6, wherein the inductive signal amplifying circuit is attachable to the mobile phone protection case.

8. The antenna case of claim 6, wherein the inductive signal amplifying circuit is printed directly on the mobile phone protection case by using a silk printing method.

9. The antenna case of claim 6, wherein the inductive signal amplifying circuit is printed directly on the protection film by using a silk printing method.

10. The antenna case of claim 6, wherein the impedance matching unit is formed on a surface of an inner portion of the mobile phone protection case as broad as possible.

11. The antenna case of claim 1, wherein the antenna case is configured as a protection film.

* * * * *

UNITED STATES PATENT AND TRADEMARK OFFICE
CERTIFICATE OF CORRECTION

| | | |
|---|---|---|
| PATENT NO. | : 8,676,280 B2 | Page 1 of 1 |
| APPLICATION NO. | : 13/424894 | |
| DATED | : March 18, 2014 | |
| INVENTOR(S) | : Kong | |

It is certified that error appears in the above-identified patent and that said Letters Patent is hereby corrected as shown below:

On the title page of the patent:

Change the Assignee information from

(73) Assignee:  Zalman Tech Co., Ltd., Seoul (KR)

To

(73) Assignee:  Kong, Byung-Won, Seoul (KR)
                      Zalman Tech Co., Ltd., Seoul (KR)

Signed and Sealed this
Twenty-ninth Day of April, 2014

Michelle K. Lee
*Deputy Director of the United States Patent and Trademark Office*